US009171357B2

United States Patent
Yi et al.

(10) Patent No.: US 9,171,357 B2
(45) Date of Patent: Oct. 27, 2015

(54) METHOD, APPARATUS AND COMPUTER-READABLE RECORDING MEDIUM FOR REFOCUSING PHOTOGRAPHED IMAGE

(75) Inventors: Jihyeon Kate Yi, Gwanak-gu (KR); Kanghee Edward Lee, Gwangjin-gu (KR)

(73) Assignee: Intel Corporation, Santa Clara, CA (US)

( * ) Notice: Subject to any disclaimer, the term of this patent is extended or adjusted under 35 U.S.C. 154(b) by 89 days.

(21) Appl. No.: 13/976,355

(22) PCT Filed: Aug. 17, 2012

(86) PCT No.: PCT/KR2012/005693
§ 371 (c)(1),
(2), (4) Date: Sep. 13, 2013

(87) PCT Pub. No.: WO2014/014135
PCT Pub. Date: Jan. 23, 2014

(65) Prior Publication Data
US 2014/0098246 A1    Apr. 10, 2014

(51) Int. Cl.
*G06T 5/00* (2006.01)
*H04N 5/232* (2006.01)
*G06T 7/00* (2006.01)

(52) U.S. Cl.
CPC ............... *G06T 5/003* (2013.01); *G06T 7/0061* (2013.01); *H04N 5/232* (2013.01); *G06T 2207/10004* (2013.01); *G06T 2207/10028* (2013.01)

(58) Field of Classification Search
CPC . H04N 5/23212; H04N 7/01; H04N 13/0271; H04N 19/17; H04N 19/61; H04N 19/85; H04N 13/0022
See application file for complete search history.

(56) References Cited

U.S. PATENT DOCUMENTS

| 8,131,098 B2 * | 3/2012 | Watanabe et al. | 382/254 |
| 2004/0093432 A1 * | 5/2004 | Luo et al. | 709/247 |
| 2007/0019883 A1 * | 1/2007 | Wong et al. | 382/276 |

FOREIGN PATENT DOCUMENTS

| JP | 2009224982 | 10/2009 |
| JP | 2009251839 | 10/2009 |
| KR | 1020090098502 | 9/2009 |

OTHER PUBLICATIONS

PCT Search Report and Written Opinion, PCT/KR2012/005693, Feb. 18, 2013, 13 pages.
Geometric and Texture Cue Based Depth-map Estimation for 2D to 3D Image Conversion, Kyuseo et al., IEEE 978-1-4244-8712-7/11, pp. 651-652.

* cited by examiner

*Primary Examiner* — Twyler Haskins
*Assistant Examiner* — Padma Haliyur
(74) *Attorney, Agent, or Firm* — Blakely, Sokoloff, Taylor & Zafman LLP (57) ABSTRACT

The present disclosure relates to a method, apparatus and computer-readable recording medium for refocusing a photographed image using a depth map. According an aspect of the present disclosure, there is provided a refocusing method including a) outputting a photographed image on a display unit; b) determining whether a region to be refocused is specified in the output image; c) computing a depth map of the output image if the region to be refocused is specified; d) acquiring a refocused image by increasing resolution of the specified region to be refocused and decreasing resolution of regions other than the specified region to be refocused, based on the computed depth map; and e) outputting the refocused image on the display unit. According to the present disclosure, when an image photographed using a camera is not focused exactly or it is intended to focus on another region of the photographed image, a refocused image can be generated by specifying a region to be refocused in the photographed image.

14 Claims, 7 Drawing Sheets

METHOD, APPARATUS AND COMPUTER-READABLE RECORDING MEDIUM FOR REFOCUSING PHOTOGRAPHED IMAGE

The present patent application is a U.S. National Phase Application under 35 U.S.C. 371 of International Application No. PCT/KR2012/005693 filed Aug. 17, 2012.

TECHNICAL FIELD

The present disclosure relates to a method, apparatus and computer-readable recording medium for refocusing a photographed image using a depth map, in which when an photographed image using an image pickup device such as a camera is not focused exactly or it is intended to focus on another region or object in a previously photographed image, if a specific region is specified, the photographed image to be refocused as desired may be acquired by obtaining a depth map of the photographed image and making the specific region sharp and the regions other than the specific region blurred based on the depth map.

BACKGROUND

As portable terminals are miniaturized and made lightweight, portable terminals become more convenient to carry, and demands on the portable terminals gradually increase. Accordingly, additional functions installed in the portable terminals are diversified.

Particularly, as a function of a digital camera provided as an additional function are recognized as an indispensable component by users recently, such a function tends to be provided in most of portable terminals. Although the focus of a digital camera employed in a portable terminal basically is set on the center of a screen, the focus may be adjusted to set on another position. That is, it is possible to take a picture by diversely adjusting the focus when photographing an object using the digital camera. For example, this function is provided in products such as iPhones or iPads.

However, the digital camera employed in a portable terminal cannot obtain a desired image by focusing on another region of a previously photographed image when the photographed image is not focused exactly.

Demands of consumers on the portable terminals are diversified. Accordingly, there is a need of techniques to be developed for obtaining a desired image by refocusing on a region selected from a photographed image.

A conventional refocusing technique is disclosed in a website at http://www.cs.columbia.edu/CAVE/projects/active_refocus/, which is a technique proposed by Francesc Moreno-Noguer et al., entitled "Active Refocusing of Images and Videos." In this technique, a projector placed in combination with a camera using a half-mirror is used to obtain a dot pattern, and depths and color segmentations corresponding to projected dots are used to compute a depth map. The depth map is used to refocus an acquired image after the dots are removed.

However, this refocusing technique has a problem in that a projector should be used in order to obtain a dot pattern needed to compute a depth map.

DETAILED DESCRIPTION OF INVENTION

Technical Problem

Therefore, an object of the present disclosure is to solve all the aforementioned problems in the prior art.

Another object of the present disclosure is to generate a refocused image, when a region to be refocused is specified in a photographed image, by obtaining a depth map of the photographed image and making the image in the specified region sharp and the image in the regions other than the specified region blurred using the depth map.

Technical Solution

Various embodiments of the present disclosure are provided to address the aforementioned problems and to realize the functional effects of the present disclosure, which will be described later, as follows:

According to an aspect of the present disclosure, there is provided a refocusing method including: a) outputting a photographed image on a display unit; b) determining whether a region to be refocused is specified in the output image; c) computing a depth map of the output image if the region to be refocused is specified; d) acquiring a refocused image by increasing resolution of the specified region to be refocused and decreasing resolution of regions other than the specified region to be refocused, based on the computed depth map; and e) outputting the refocused image on the display unit.

According another aspect of the present disclosure, there is provided a refocusing apparatus including: a camera for generating a photographed image by photographing an object; a display unit for outputting the photographed image and to specify a region to be refocused in the output image; a storage unit for storing the photographed image, a refocused image and a refocusing application; and a control unit for controlling the display unit to output the photographed image on the display unit if the refocusing application is executed to select a refocusing function and the photographed image is selected, the control unit for computing a depth map of the output photographed image if the region to be refocused is specified in the output photographed image, the control unit for acquiring the refocused image by increasing resolution of the specified region to be refocused and decreasing resolution of regions other than the specified region to be refocused based on the computed depth map, and the control unit for controlling the display unit to output the refocused image on the display unit.

Advantageous Effects

According to the present disclosure, when an image photographed using a camera is not focused exactly or it is intended to focus on another region of the photographed image, a refocused image can be conveniently generated by specifying a region in the photographed image.

EMBODIMENTS

In the following detailed description of the present disclosure, references are made to the accompanying drawings that show, by way of illustration, specific embodiments in which the present disclosure may be implemented. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range equivalent to what the claims claim. In the drawings, like reference numbers refer to the same or similar function through many ways.

Hereinafter, various embodiments of the present disclosure will be described in detail with reference to the accompanying drawings in order that those skilled in the art can implement the present disclosure easily.

Figure 1:
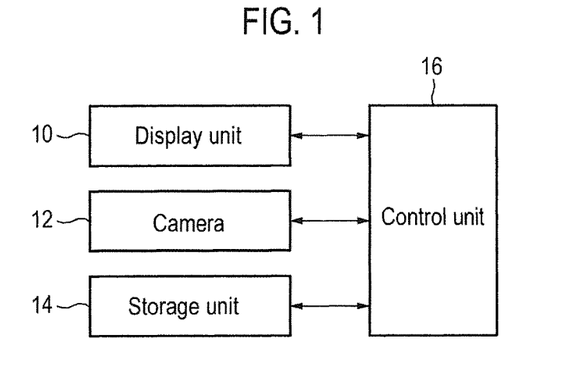
FIG. 1 is a block diagram showing the configuration of a refocusing apparatus according to an embodiment of the present disclosure.

FIG. 1 is a block diagram showing the configuration of a refocusing apparatus according to an embodiment of the present disclosure. A refocusing apparatus 100 may include a display unit 10, a camera 12, a storage unit 14 and a control unit 16.

The respective functions of the blocks shown in FIG. 1 may be described as follows.

The display unit 10 may have a touch sensor attached thereto to input data by a user's touch of the screen, output a photographed image, and perform a function of outputting a refocused image if a user specifies a region to be refocused in the previously photographed output image using the touch sensor.

The camera 12 may generate the photographed image by photographing an object.

The storage unit 14 may store the photographed image and the refocused image related thereto. Additionally, the storage unit 14 may store a refocusing application.

The refocusing application may include an image editing function, in addition to the refocusing function. The image editing function may include functions of, for example, cutting an image, removing a red eye effect, automatically turning on high definition, and rotating an image.

The control unit 16 may control to store a photographed image and a refocused image in the storage unit 14, execute the refocusing application, output the photographed image on the display unit 10 if the refocusing function is selected and the photographed image is chosen, generate a refocused image if a region to be refocused is specified in the output photographed image, and output the refocused image on the display unit 10.

Figure 2:
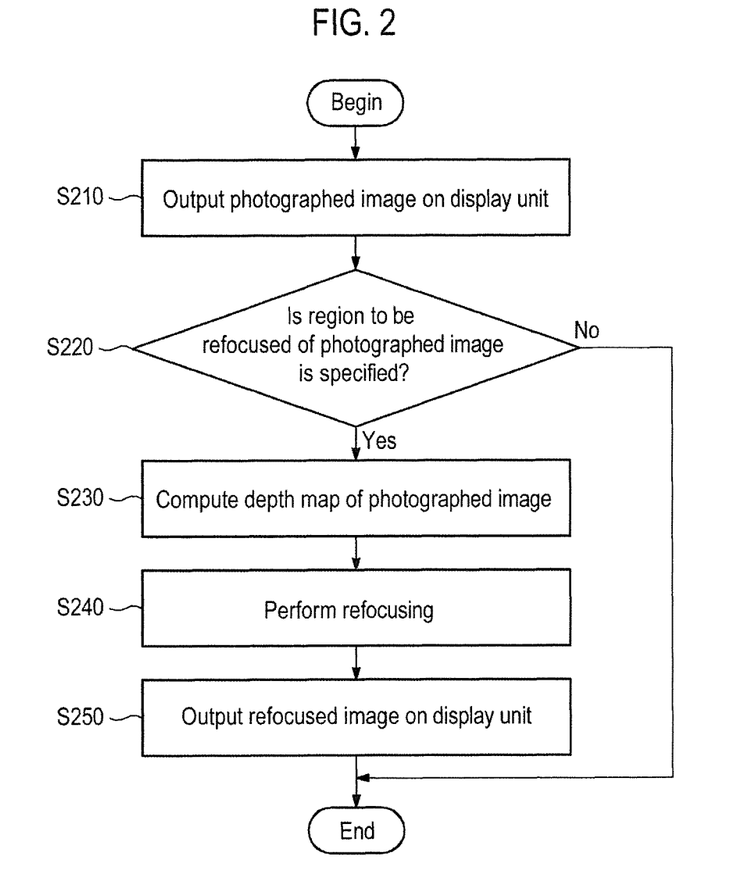
FIG. 2 is a flowchart illustrating a refocusing method according to an embodiment of the present disclosure.

FIG. 2 is a flowchart illustrating a refocusing method according to an embodiment of the present disclosure. As an embodiment, the operation of FIG. 2 may be executed by the control unit 16 of FIG. 1.

A photographed image is output on the display unit 10 (S210).

It is determined whether a region (or object) to be refocused in the output photographed image is specified (S220).

If the region to be refocused is specified, a depth map of the output photographed image is computed (S230).

For reference, a variety of methods for obtaining the depth map of step S230 are introduced, and any one of the methods may be used in the present disclosure. For example, a method of obtaining a depth map is described in detail in a paper entitled "Geometric and Texture Cue Based Depth-map Estimation for 2D to 3D Image Conversion" presented by Kyuseo Han et al., in IEEE International Conference on Consumer Electronics published in 2011, herein incorporated by reference. Another example of such a method is described in detail in a paper entitled "2D-to-3D Conversion System Using Edge Information" presented by Chao-Chung Cheng et al., in an IEEE magazine published in 2010, herein incorporated by reference.

Based on the computed depth map, a refocused image is acquired by increasing a resolution of the region to be refocused in the output photographed image to make it sharper and decreasing a resolution of the other regions to make them blurred (S240).

As an example of the refocusing method, a refocusing technique disclosed in a website at http://www.cs.columbia.edu/CAVE/projects/active_refocus/ may be used, herein incorporated by reference. A technique proposed by Francesc Moreno-Noguer et al., entitled "Active Refocusing of Images and Videos," is disclosed in this site. In this technique, a projector placed in combination with a camera using a half-mirror is used to obtain a dot pattern, depths and color segmentations corresponding to projected dots are used to compute a depth map, and the depth map is used to refocus an acquired image after the dots are removed. Contents related to the method of obtaining a refocused image among the content presented in this reference may be included in the present disclosure.

In the method of acquiring a refocused image presented in this reference, when an image of a region F (foreground) having a depth map dF, a region G (background) having a depth map dG and a region C (boundary) having a depth map between the depth maps dF and dG is refocused, a first refocused image RC eF in which the depth map dF is assigned to all dots in the region C (all the dots in the region C obtained from a dot pattern) is computed, a second refocused image RC is computed by assigning the depth map dG to the pixels in the region C, and a final refocused image is computed by R=RCϵF*A+RCϵG*(1−A). Here, "A" denotes an alpha map expressing probability of respective pixels that will belong to the region F, "1" denotes a matrix of "1" having the same size as "A," and "*" denotes element-wise multiplication. This method may be used in step S240 of the present disclosure.

The refocused image is output on the display unit 10 (S250). Additionally, the refocused image may be stored in the storage unit 14.

Figure 3:
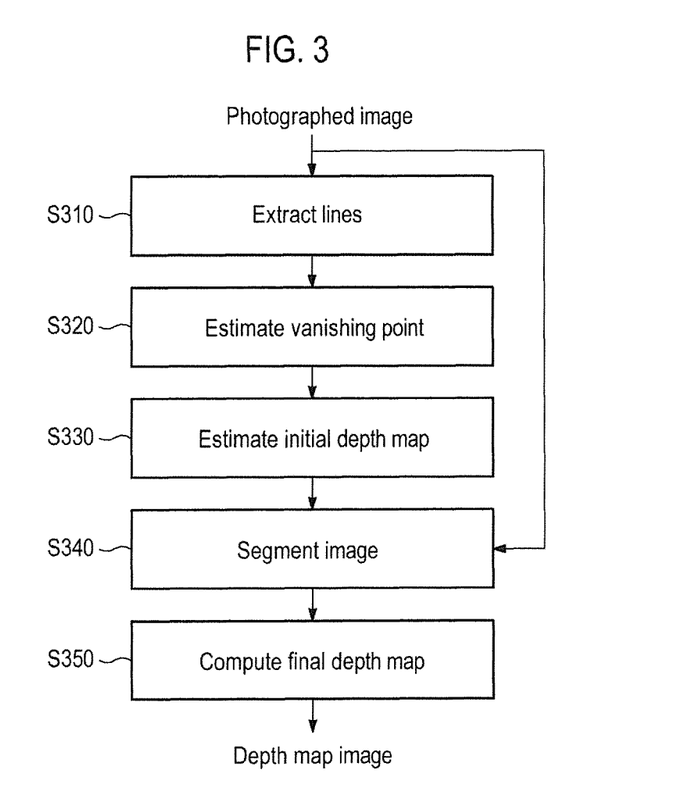
FIG. 3 is a flowchart illustrating a method of acquiring a depth map image from a photographed image according to an embodiment of the present disclosure.

FIG. 3 is a flowchart illustrating a method of acquiring a depth map image from a photographed image according to an embodiment of the present disclosure.

First, lines may be extracted from the photographed image (S310). In step S310, lines such as boundary or contour lines may be extracted by applying, for example, Hough transform to the photographed image. The Hough transform may be used to look for general characteristics such as a straight line, a curved line or a circle from an image. According to a basic Hough transform method, a general equation corresponding to the characteristics is created using input samples, and an accumulation array (histogram) of factors of the equation may be created. A most frequently accumulated factor in the accumulation array may be a characteristic which most frequently appears in the image.

A vanishing point may be estimated based on the characteristics of the lines extracted from the photographed image (S320). The vanishing point is a point where parallel lines of a three-dimensional source converge on a two-dimensional image, which may play an important role in perceiving a depth by extracting perspective geometry.

An initial depth map may be generated under the assumption that the vanishing point estimated from the photographed image has an indefinite depth, e.g., the largest depth, in the photographed image and the depth changes smoothly from the vanishing point within the photographed image (S330). In one embodiment, the assumption of having a smooth depth change is that the vanishing point has the largest depth in the photographed image and the surrounding areas gradually have a smaller depth as they are further away from the vanishing point. For example, if it is assumed that a depth value of the vanishing point is 255, each surrounding point has a value gradually decreasing (that is, the distance is closer if the value is smaller), such as 254, 253, . . . , as they go to the periphery, and a distribution of these depth values may be set to follow a Gaussian distribution. That is, the smooth depth change means that a vanishing point has an indefinite depth and a distribution of the depth values of the photographed image has a Gaussian distribution with respect to the vanishing point.

In step S330, the initial depth map may be set with respect to the estimated vanishing point on the basis of the Gaussian distribution.

The photographed image may be segmented by applying graph-based segmentation (S340). The graph-based segmentation is a technique of segmenting image data by expressing the image data as a graph. A general graph-based segmentation method includes a normalized cut, a typical cut, a min cuts (maximum flow) and the like. The min cuts (maximum flow) are frequently used. Since both a pair-wise pixel similarity and characteristic of a group can be considered by expressing the image data as a graph, a powerful mechanism can be provided, and accordingly, efficiency of computation may be improved.

Each of the segmented images may represent each corresponding object within the photographed image.

Depth orders may be assigned to the segmented images of the photographed image by applying the initial depth map estimation to the segmented images (S350). For this reason, a depth map based on the initial depth map estimation may be assigned to each of the segmented images.

The depth map of the photographed image may be acquired by performing step S350.

FIGS. 4 to 7 are exemplary views showing a photographed image and refocused images according to an embodiment of the present disclosure.

Figure 4:
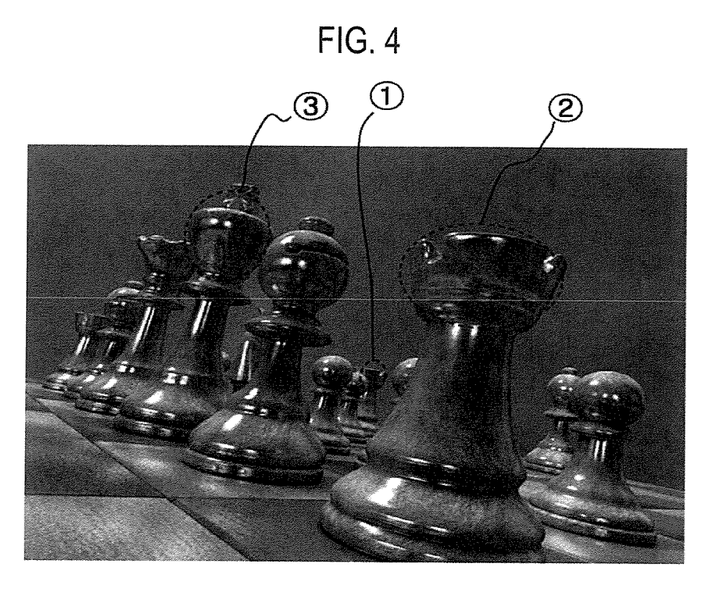
FIGS. 4 to 7 are exemplary views showing a photographed image and refocused images according to an embodiment of the present disclosure.
Figure 5:
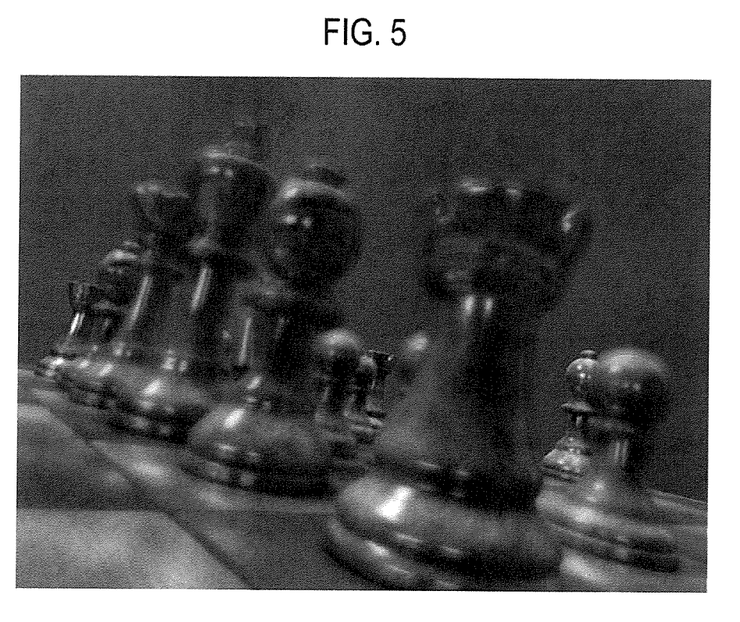
Figure 6:
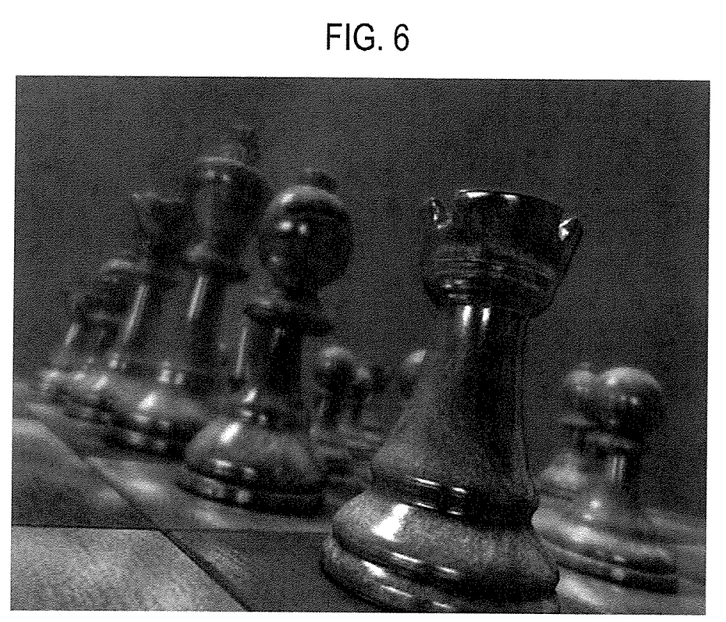
Figure 7:
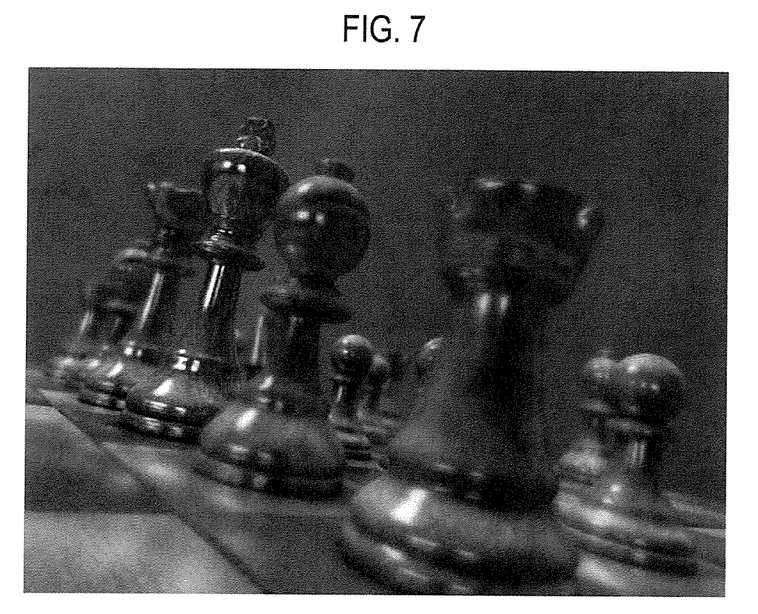

FIG. 4 is a view showing an original image photographing chess pieces arranged on a chess board. If the refocusing application is executed and the refocusing function is selected by the control unit 16 of FIG. 1 and the photographed image of FIG. 4 is selected, the photographed image may be output on the display unit 10. In this condition, if the object in a region ① of the photographed image of FIG. 4 is specified, the control unit 16 may acquire a depth map of the photographed image and set the refocused image of FIG. 5 by increasing resolution to make an image of the object in region ① of the photographed image of FIG. 4 sharper and decreasing resolution to make an image of the other regions blurred. In the same manner, if an object in a region ② of the photographed image of FIG. 4 is specified, the control unit 16 may acquire the refocused image of FIG. 6 by increasing resolution to make an image of the object in the region ② of the photographed image of FIG. 4 sharper and decreasing resolution to make an image of the other regions blurred. In addition, if an object in a region ③ of the photographed image of FIG. 4 is specified, the control unit 16 may acquire the refocused image of FIG. 7 by increasing resolution to make an image of the object in the region ③ of the photographed image of FIG. 4 sharp and decreasing resolution to make an image of the other regions blurred.

According to the method described above, since a part of a subject positioned at a desired distance may be refocused to be suitable for a user's preference, although a digital picture is already photographed, this may help a user to conveniently generate a picture that is satisfactory to the user without making an effort of photographing the subject again.

The refocusing method of the present disclosure may be applied to a smart phone or a tablet PC to generate a refocused image by diversely changing the focus of an image photographed by a camera.

The embodiments according to the present disclosure described above can be implemented in the form of program commands that can be executed through various computer components and recorded in a computer-readable recording medium. The computer-readable recording medium may include a program command, a data file, a data structure and the like solely or in a combined manner. The program command recorded in the computer-readable recording medium may be a program command specially designed and configured for the present disclosure or a program command known to be used by those skilled in the art of the computer software field. The computer-readable recording medium includes, for example, a magnetic medium, such as a hard disk, a floppy disk and a magnetic tape, an optical recording medium, such as a CD-ROM and a DVD, a magneto-optical medium, such as a floptical disk, and a hardware device specially configured to store and execute program commands, such as a ROM, a RAM, a flash memory and the like. The program command includes, for example, a high-level language code that can be executed by a computer using an interpreter or the like, as well as a machine code generated by a compiler. The hardware devices can be configured to operate using one or more software modules in order to perform the processing according to the present disclosure, and vice versa.

In the foregoing discussion, although the present disclosure has been described in connection with the specific matters, such as the specific components, the exemplary embodiments, and the drawings, they are provided only for assisting in the understanding of the present disclosure, and the present disclosure is not limited to the embodiments. It will be apparent that those skilled in the art can make various modifications and changes thereto from these descriptions.

Therefore, the spirit of the present disclosure should not be limited to the aforementioned embodiments, and the appended claims and what are modified equally or equivalently thereto will be considered to fall within the scopes of the present disclosure.

What is claimed is:

1. A refocusing method, comprising:
   a) outputting a photographed image on a display unit;
   b) determining whether a region to be refocused is specified in the output image;
   c) computing a depth map of the output image if the region to be refocused is specified; including:
      c1) extracting lines from the output photographed image;
      c2) estimating a vanishing point based on characteristics of the extracted lines;
      c3) estimating an initial depth map assuming that the vanishing point estimated from the photographed image has an indefinite depth and depth values of the photographed image follows a Gaussian distribution with respect to the vanishing point; and c4) acquiring the depth map of the photographed image by segmenting the photographed image and assigning depth orders to the segmented images by applying the estimated initial depth map to the segmented images;

d) acquiring a refocused image by increasing resolution of the specified region to be refocused and decreasing resolution of regions other than the specified region to be refocused, based on the computed depth map; and e) outputting the refocused image on the display unit.

2. A method of claim 1, wherein step c1) includes extracting the lines from the output image by applying Hough transform.

3. A method of claim 1, wherein step c3) includes estimating the initial depth map based on a Gaussian distribution having the estimated vanishing point as an average.

4. A method of claim 1, wherein step c4) includes segmenting the photographed image using graph-based segmentation, the graph-based segmentation performing the segmentation by expressing image data of the photographed image as a graph.

5. A refocusing apparatus, comprising:

a camera for generating a photographed image by photographing an object;

a display unit for outputting the photographed image and specifying a region to be refocused in the output image;

a storage unit for storing the photographed image, a refocused image and a refocusing application; and a control unit for controlling the display unit to output the photographed image on the display unit if the refocusing application is executed to select a refocusing function and the photographed image is selected, the control unit for computing a depth map of the output photographed image if the region to be refocused is specified in the output photographed image, including extracting lines from the output photographed image, estimating a vanishing point based on characteristics of the extracted lines, estimating an initial depth map assuming that the vanishing point estimated from the photographed image has an indefinite depth and depth values of the photographed image follows a Gaussian distribution with respect to the vanishing point and acquiring the depth map of the photographed image by segmenting the photographed image and assigning depth orders to the segmented images by applying the estimated initial depth map to the segmented images, the control unit for acquiring the refocused image by increasing resolution of the specified region to be refocused and decreasing resolution of regions other than the specified region to be refocused based on the computed depth map, and the control unit for controlling the display unit to output the refocused image on the display unit.

6. The apparatus of claim 5, wherein the refocusing application additionally provides functions of cutting an image, removing a red eye effect, automatically turning on high definition, and rotating an image.

7. The apparatus of claim 5, wherein the control unit extracts the lines from the output image by applying Hough transform.

8. The apparatus of claim 5, wherein the control unit estimates the initial depth map based on a Gaussian distribution having the estimated vanishing point as an average.

9. The apparatus of claim 5, wherein the control unit segments the photographed image using graph-based segmentation, the graph-based segmentation performing the segmentation by expressing image data of the photographed image as a graph.

10. The apparatus of claim 5, wherein the refocusing apparatus is a smart phone or a tablet PC.

11. A non-transitory computer readable medium having a computer program which when executed causes a processor to:

output a photographed image on a display unit;

determine whether a region to be refocused is specified in the output image;

c) compute a depth map of the output image if the region to be refocused is specified; including:

c1) extracting lines from the output photographed image;

c2) estimating a vanishing point based on characteristics of the extracted lines;

c3) estimating an initial depth map assuming that the vanishing point estimated from the photographed image has an indefinite depth and depth values of the photographed image follows a Gaussian distribution with respect to the vanishing point; and c4) acquiring the depth map of the photographed image by segmenting the photographed image and assigning depth orders to the segmented images by applying the estimated initial depth map to the segmented images;

acquire a refocused image by increasing resolution of the specified region to be refocused; and decrease resolution of regions other than the specified region to be refocused, based on the computed depth map; and output the refocused image on the display unit.

12. The computer readable medium of claim 11, wherein extracting lines from the output photographed image comprises extracting the lines from the output image by applying Hough transform.

13. The computer readable medium of claim 12, wherein estimating an initial depth map comprises estimating the initial depth map based on a Gaussian distribution having the estimated vanishing point as an average.

14. The computer readable medium of claim 12, wherein acquiring the depth map comprises segmenting the photographed image using graph-based segmentation, the graph-based segmentation performing the segmentation by expressing image data of the photographed image as a graph.

* * * * *

UNITED STATES PATENT AND TRADEMARK OFFICE
CERTIFICATE OF CORRECTION

PATENT NO.        : 9,171,357 B2
APPLICATION NO.   : 13/976355
DATED             : October 27, 2015
INVENTOR(S)       : Jihyeon Kate Yi et al.

Page 1 of 1

It is certified that error appears in the above-identified patent and that said Letters Patent is hereby corrected as shown below:

On the Title Page:
In (22) Filed:, Delete "Aug. 17, 2012" and insert --Jul. 17, 2012--.

Signed and Sealed this
Eighth Day of March, 2016

Michelle K. Lee
*Director of the United States Patent and Trademark Office*